(12) United States Patent
DeFelice et al.

(10) Patent No.: US 10,870,130 B2
(45) Date of Patent: Dec. 22, 2020

(54) METHOD FOR PREPARING FINE POWDERS FOR USE IN SELECTIVE LASER SINTERING PROCESSES

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 1264 days.

(21) Appl. No.: 14/740,602

(22) Filed: Jun. 16, 2015

(65) Prior Publication Data

US 2015/0328665 A1  Nov. 19, 2015

Related U.S. Application Data

(63) Continuation of application No. PCT/US2013/076361, filed on Dec. 19, 2013.
(Continued)

(51) Int. Cl.
*B07B 13/04* (2006.01)
*C08J 3/12* (2006.01)
(Continued)

(52) U.S. Cl.
CPC ............. *B07B 13/04* (2013.01); *B02C 23/08* (2013.01); *B07B 15/00* (2013.01); *C08J 3/12* (2013.01);
(Continued)

(58) Field of Classification Search
CPC ........ B07B 13/04; B07B 15/00; B02C 23/08; C08J 3/12; C08J 2371/00; B33Y 40/00; B29C 64/153; B29K 2071/00
(Continued)

(56) References Cited

U.S. PATENT DOCUMENTS 5,342,919 A * 8/1994 Dickens, Jr. .......... B29C 41/003
528/323
5,527,877 A * 6/1996 Dickens, Jr. .......... B29C 41/003
528/323
(Continued)

FOREIGN PATENT DOCUMENTS

DE  102004062762 A1  6/2006
WO       9729148 A1  8/1997

OTHER PUBLICATIONS

Yan C-Z, et al.; "Application of Polymeric Materials in Selective Laser Sintering-(II) effects of Polymer Characteristics on Forming"; Aug. 2010; 1 page abstract.
(Continued)

*Primary Examiner* — Adam J Eiseman
*Assistant Examiner* — Mohammed S. Alawadi
(74) *Attorney, Agent, or Firm* — Welsh IP Law LLC

(57) ABSTRACT

A process for preparing a feedstock having polyaryletherketone particles for using in selective laser sintering. The process includes the steps of determining a particle size distribution of the polyaryletherketone particles in the feedstock based on a number of particles corresponding to each of a plurality of particle size ranges to obtain a particle size distribution determination. The process further includes the step of reducing the number of particles in the feedstock corresponding to one or more size ranges having a depressed melting temperature relative to the average melting temperature of the polyaryletherketone particles in the feedstock based on the particle size distribution determination.

17 Claims, 1 Drawing Sheet

Related U.S. Application Data

(60) Provisional application No. 61/739,129, filed on Dec. 19, 2012.

(51) Int. Cl.

| | | |
|---|---|---|
| *B02C 23/08* | (2006.01) | |
| *B07B 15/00* | (2006.01) | |
| *B29C 64/153* | (2017.01) | |
| *B33Y 40/00* | (2020.01) | |
| *B29K 71/00* | (2006.01) | |

(52) U.S. Cl.
CPC ........ *B29C 64/153* (2017.08); *B29K 2071/00* (2013.01); *B33Y 40/00* (2014.12); *C08J 2371/00* (2013.01)

(58) Field of Classification Search
USPC ....................................................... 241/24.1
See application file for complete search history.

(56) References Cited

U.S. PATENT DOCUMENTS

| | | | | |
|---|---|---|---|---|
| 6,110,411 A | * | 8/2000 | Clausen | ................ B29C 41/003 264/497 |
| 7,875,234 B2 | * | 1/2011 | Richter | .................... B29B 9/02 264/604 |
| 2006/0134419 A1 | | 6/2006 | Monsheimer et al. | |
| 2007/0183918 A1 | | 8/2007 | Monsheimer et al. | |

OTHER PUBLICATIONS

International Search Report and Written Opinion of the International Searching Authority Application No. PCT/US2013/076361 Completed: Apr. 9, 2014; dated Apr. 25, 2014 11 pages.

European Office Action Application No. 13818622.6 Completed Date: Sep. 28, 2017 4 Pages.

Yan C-Z et al: "Application of polymeric materials in selective laser sintering—(II) Effects of polymer characteristics on forming", Database Compendex, Engineering Information, Inc., New York, NY, US; Aug. 2010 (Aug. 2010).

International Preliminary Report on Patentability & Written Opinion of the International Searching Authority Application No. PCT/US2013/076361 dated Jun. 23, 2015 7 pages.

Ajit Jillavenkatesa et al: "Particle Size Characterization", published, Jan. 1, 2001, Nist Recommended Practice G, pp. 1-167.

European Office Action Application No. 13818622.6 Completed: Dec. 7, 2018 5 Pages.

\* cited by examiner

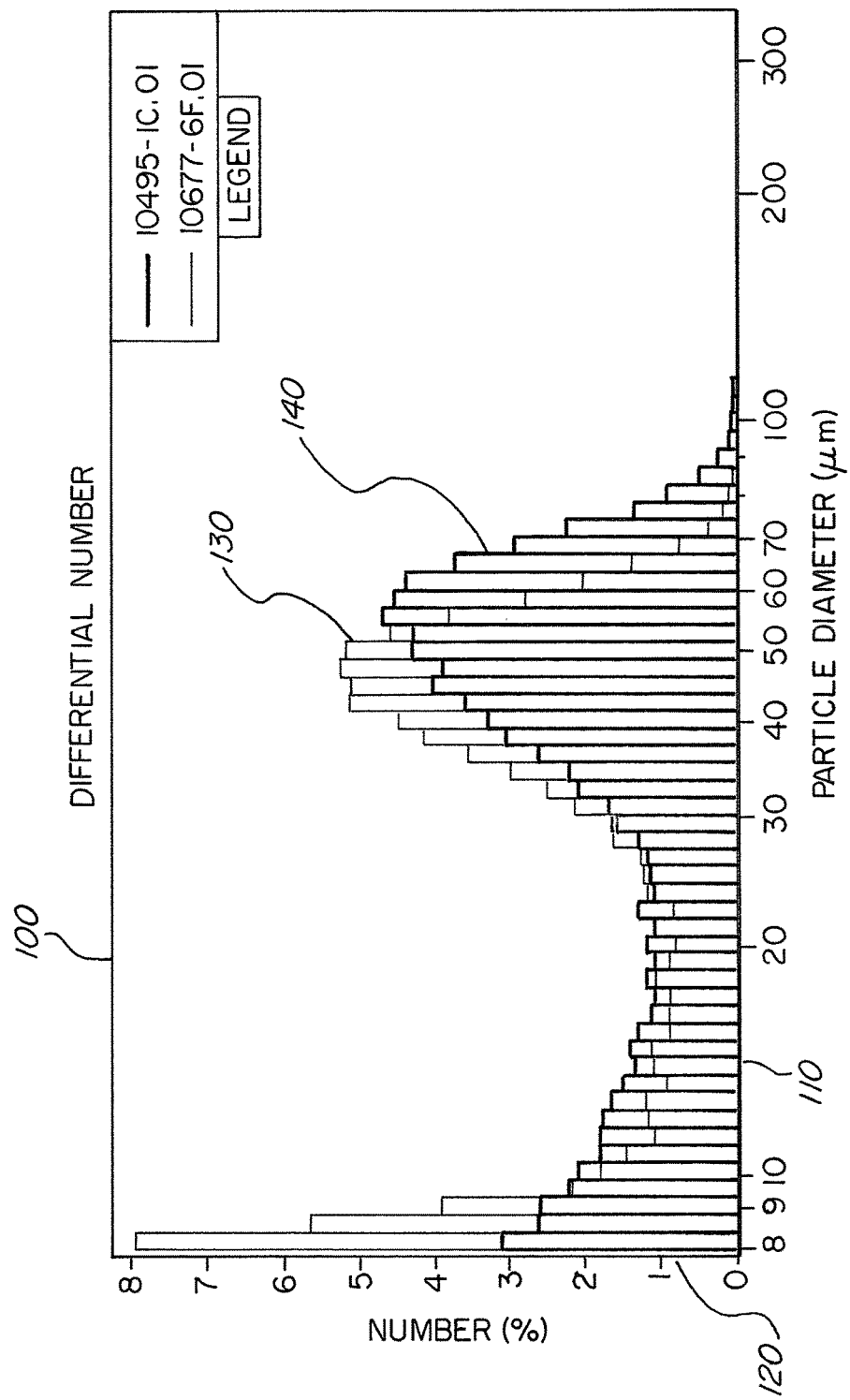

METHOD FOR PREPARING FINE POWDERS FOR USE IN SELECTIVE LASER SINTERING PROCESSES

FIELD OF THE INVENTION

The present invention relates to an additive manufacturing process. More specifically, the present invention relates to a method of preparing polymer powders for use in selective laser sintering.

BACKGROUND OF THE INVENTION

The use of additive manufacturing processes, sometimes referred to as 3D printing, has become more popular in recent years. Selective laser sintering (SLS) is an additive manufacturing process that uses a high power laser (for example, a carbon dioxide laser) to fuse small particles of plastic, metal (direct metal laser sintering), ceramic, or glass powders into a mass having a desired three-dimensional shape. The laser is controlled to selectively fuse the powdered layer by scanning portions of the cross-section corresponding to a three-dimensional digital description of the part on the surface of a powder bed. After each cross-section is scanned, the powder bed is lowered by one layer thickness, the bed is recoated with a new layer of powder, and the bed is scanned again by the laser. The process is repeated until the desired three-dimensional shape is achieved.

An example of a material used for feedstock for SLS is polyaryletherketones (PAEK). Parts that have been manufactured from PAEK powder or PAEK granulates are characterized by a low flammability, a good biocompatibility as well as a high resistance against hydrolysis and radiation. It is the thermal resistance also at elevated temperatures as well as the chemical resistance that distinguishes PAEK powders from ordinary plastic powders. A PAEK polymer powder may be a powder from the group consisting of polyetheretherketone (PEEK), polyetherketoneketone (PEKK), polyetherketone (PEK), polyetheretherketoneketone (PEEKK) or polyetherketoneetherketoneketone (PEKEKK).

In preparing powder materials, also referred to as feedstock, for the SLS process, it is known to use particle size distributions (PSD) of the feedstock to ensure that a uniform part is made and to ensure the SLS machine runs without interruption. The PSD of a feedstock powder is used to illustrate the mass of particles in a feedstock having a certain size range relative to the total mass of the feedstock. The PSD of a particular lot of powder can be plotted, for example, on a histogram to illustrate the distribution relative amount of different size particles by mass.

A disadvantage of SLS feedstock, and more specifically PAEK feedstock, is that it becomes more difficult to control the quality of the SLS process when a diameter of the particles in the feedstock is small, for example, less than 30 microns. It has been found that such particles having a smaller diameter typically melt at a depressed temperature compared particles having a larger diameter. Larger diameter particles, typically greater than 30 microns, melt, or fuze, at a specific temperature, sometimes referred to as a glazing point. At the glazing point, a visible change in the powder indicates the onset of fusion (also referred to as auto-sintering) of the powder. Smaller particles, for example having a diameter of less than 30 microns, can melt from 5 to 50 degrees Celsius below the glazing point. This is a disadvantage because such particles begin melting prematurely during the recoating process, for example before and while they are being dispersed on the layer-wise bed prior to laser sintering. The premature melting may cause pilling, sticking, and other forms of fouling in steps of the SLS process in which smooth flowing powder are preferred and expected, and make built parts more susceptible to structural failure.

It is known to overcome the aforementioned disadvantages associated with premature melting of the feedstock by controlling the lower size limit of particles in the feedstock. This control can be achieved by setting and maintaining a particle size cut-off. Typically with such cutoff methods, particles below the cutoff diameter, for example 30 microns, are excluded from the feedstock or are reduced from the feedstock. A disadvantage of this solution is that it reduces the yield of the powder grinding operation because it excludes particles below a certain size. This is a disadvantage, especially when the feedstock is relatively expensive to procure. A further disadvantage of this known solution is that the aforementioned problems may continue to persist even after the cut-off.

What is desired therefore is a method for overcoming the problems associated with the prior art.

SUMMARY OF THE INVENTION

The present invention resides in one aspect in a process for preparing a feedstock for selective laser sintering. The feedstock comprises polyaryletherketone particles. The process includes the steps of determining a particle size distribution of the polyaryletherketones particles in the feedstock based on a number of particles corresponding to each of a plurality of particle size ranges to obtain a particle size distribution determination. The process further includes the step of reducing the number of particles in the feedstock corresponding to one or more size ranges having a depressed melting temperature relative to the average melting temperature of the polyaryletherketone particles in the feedstock based on the particle size distribution determination.

In another embodiment, the depressed temperature is 5 or more degrees Celsius below the average melting temperature of the polyaryletherketone particles in the feedstock.

In yet a further embodiment of the present invention, the depressed temperature is between 5 and 50 degrees Celsius below the average melting temperature of the polyaryletherketone particles in the feedstock.

In yet another embodiment of the present invention, the process includes the step of reducing the number of particles in the feedstock corresponding to any of the size ranges having particle diameters of 10 microns or less.

In yet another embodiment of the present invention, the process includes the step of reducing the number of particles in the feedstock corresponding to any of the size ranges having particle diameters of 10 microns or less.

In yet another embodiment of the present invention, the process includes the step of reducing the number of particles in the feedstock corresponding to any of the size ranges having particle diameters of 10 microns or less.

In yet another embodiment of the present invention, the process includes the step of reducing the number of particles in the feedstock corresponding to any of the size ranges having particle diameters of 10 microns or less.

In yet another embodiment of the present invention, the process includes the step of reducing the number of particles in the feedstock corresponding to any of the size ranges having particle diameters of 10 microns or less.

In yet a further embodiment of the present invention, the feedstock consists essentially of polyetherketoneketone.

The present invention resides in yet another aspect in a process for preparing a polymer for selective laser sintering. The polymer includes one or more polyaryletherketones. The process includes the step of pulverizing the one or more polyaryletherketones to form a powder comprising polyaryletherketone particles. The process includes the further step of determining a particle size distribution of the polyaryletherketone particles based on a number of particles. The process further includes the steps of creating a feedstock from the polyaryletherketone particles and limiting the number of particles in the feedstock based on the particle size distribution determination.

In one embodiment of the disclosed invention, the process includes the further step of limiting the number of particles in the feedstock having a depressed melting temperature relative to the average melting temperature of the polyaryletherketone particles.

In yet a further embodiment of the present invention, the depressed temperature is between 5 and 50 degrees Celsius below the average melting temperature of the polyaryletherketone particles.

In yet another embodiment of the present invention, the process includes the step of limiting the number of particles in the feedstock corresponding to one or more size ranges in the particle size distribution having particle diameters of 10 microns or less.

In yet another embodiment of the present invention, the process includes in the step of limiting the number of particles in the feedstock corresponding to one or more size ranges in the particle size distribution having particle diameters of 15 microns or less.

In yet another embodiment of the present invention, the process includes in the step of limiting the number of particles in the feedstock corresponding to one or more size ranges in the particle size distribution having particle diameters of 20 microns or less.

In yet another embodiment of the present invention, the process includes in the step of limiting the number of particles in the feedstock corresponding to one or more size ranges in the particle size distribution having particle diameters of 25 microns or less.

In yet another embodiment of the present invention, the process includes in the step of limiting the number of particles in the feedstock corresponding to one or more size ranges in the particle size distribution having particle diameters of 30 microns or less.

In yet a further embodiment of the present invention, the feedstock consists essentially of polyetherketoneketone.

BRIEF DESCRIPTION OF THE DRAWINGS

FIG. 1 is a chart illustrating a particle size distribution of a first feedstock and a second feedstock.

DETAILED DESCRIPTION OF THE INVENTION

The inventors have discovered that the known procedure for preparing polyaryletherketone feedstock to inhibit premature melting, namely excluding or limiting undesirably sized particles from the feedstock based on a PSD using relative mass or relative volume, obscures the far more important characteristic of the powders that causes the premature melting. The inventors have discovered that the count, or number, of the small particles in the feedstock is a more significant factor in premature melting of the particles during SLS than is the relative mass of the small particles, or the relative volume of the small particles. The relative number of small particles, specifically those less than 30 microns, and more specifically those less than 15 microns, is far more significant than the relative mass or relative volume of such small particles in preparing a feedstock that inhibits premature melting during SLS.

The collective mass of such fine particles is relatively small compared to the overall mass of the feedstock. Similarly, the collective volume of such fine particles is relatively small compared to the overall volume of the feedstock. As a result, the existence of such small particles is minimized, or becomes statistically irrelevant, when a feedstock is analyzed using a PSD determination based on relative mass or relative volume. The inventors have discovered, however, that by analyzing a PSD by relative particle number it is possible understand the distribution of the number of small particles, and prepare a feedstock which addresses such distribution to inhibit premature melting during SLS.

The count of small particles below a determined critical threshold can be enormous when compared to the overcall particle count of the feedstock. The small particles can contribute largely to the aforementioned fouling behaviors by creating an enormous number of sticking points throughout the powder bed during the SLS process. The count of small particle and the effects thereof are not accounted for and are not understood with the known feedstock processing methods.

To inhibit premature melt, it is currently known to reduce the weight or volume of particles below a certain diameter. For example, using known methods, the mass of particles having a diameter less than a critical size, for example 30 microns, are reduced relative to the overall mass of the sample. Typically, however, the reduction in the mass of particles below the critical value would not fully solve the problem associated with premature particle melt because it does not address the root cause of the problem, namely, controlling the number of small particles relative to the overall number of particles of the feedstock.

Therefore, because the problem of premature melting tended to persist despite best efforts to account for it, it was known to increase the critical size, for example to 35 of 40 microns, or to further reduce the mass or volume of particles below the critical size. While such actions may inhibit some of the disadvantages associated with premature particle melt, they also reduce the yield of the powder grinding operation because additional particles are excluded from the feedstock. This exclusion can significantly impact the economics of the SLS process. This is especially true when using a relatively expensive feedstock such as polyetherketoneketone.

The disadvantages associated with the known methods are overcome by employing a PSD based on the relative number of particles. By determining a particle size distribution of a feedstock, for example one comprising polyaryletherketone particles, based on a number of particles corresponding to each of a plurality of particle size ranges it is possible to more accurately identify the source of premature particle melting and adjust the feedstock accordingly to inhibit premature particle melting during SLS.

In one embodiment in accordance with the present invention a feedstock is prepared from one or more polymers selected from the polyaryletherketone family. The one or more polyaryletherketones are pulverized to form a powder comprising polyaryletherketone particles. It should be understood that the polyaryletherketones may be pulverized using any method or machine known to a person having ordinary skill in the art. In this embodiment, the pulverized particles vary in size, typically from a diameter of 8 microns to a diameter of more than 100 microns. It will be understood by a person of ordinary skill in the art that although the term diameter is used in reference to the size of the particles, particles are not limited to a spheroid as their shape may vary.

A particle size distribution of the polyaryletherketone particles based on a number of particles is determined. The determination may be made using any technique known to a person of ordinary skill in the art. Next, a feedstock for SLS is assembled from the polyaryletherketone particles using the results of the particle size distribution determination. The results of the particle size distribution determination by relative particle are used to limit the number of small particles, i.e. below a selected size threshold, that are included in the feedstock, thereby inhibiting premature melting during the SLS process.

In some embodiments of the present invention, the number of particles in the feedstock having a depressed melting temperature relative to the average melting temperature of the polyaryletherketone particles is limited. In some embodiments, the depressed temperature is between 5 and 50 degrees Celsius below average melting temperature of the polyaryletherketone particles. In some embodiments, the step of limiting the number of particles removes a portion of the particles having a diameters of 10 microns or less. In other embodiments, the removal of particles is limited to diameters of 15 microns or less.

In reference to FIG. 1, a chart 100 illustrating the difference between a first feedstock and a second feedstock is shown. The first feedstock was assembled based on the results of a PSD relative mass determination. The second feedstock was assembled based on a PSD relative particle count determination. The first feedstock and the second feedstock were subsequently analyzed to determine a PSD based on relative particle count. The chart 100 shows the two PSD determinations 130, 140, each based on particle count. The x-axis 110 of the chart corresponds to the particle diameter and is shown in logarithmic scale. The y-axis 120 of the chart 100 corresponds to the percentage of particles in a specific size range relative to the overall number of particles.

The first PSD 130 corresponds to the first feedstock. The first feedstock was assembled in accordance with the prior art using a PSD based on relative mass so as to inhibit premature melting. The first PSD 130 is illustrated by gray rectangles. The second PSD 140 corresponds to the second feedstock. The second feedstock was assembled in accordance with the present invention using a PSD based on relative particle count so as to inhibit premature melting. The second PSD 140 is illustrated by black rectangles.

In reference to FIG. 1, it is evident that first feedstock and the second feedstock each have a center hump. However, at the far left of the chart 100, representing the smaller particles in each respective feedstock, the number of fine particles is much higher for the first feedstock as compared to the second feedstock. This is because the first feedstock was assembled based on mass sum PSD and the small particles contribute very little to this, and therefore were not accounted for in preparation of the second lot. By using the PSD based on particle number 140, it is possible to account for the small particles and adjust the feedstock accordingly. In this manner, it is possible to accurately account for the particles that significantly impact premature melting and adjust the feedstock accordingly, while at the same time increasing the overall yield of the process.

Although the present invention has been disclosed and described with reference to certain embodiments thereof, it should be noted that other variations and modifications may be made, and it is intended that the following claims cover the variations and modifications within the true scope of the invention.

What is claimed is:

1. A process for preparing a feedstock with a plurality of polyaryletherketone (PAEK) particles for selective laser sintering, each of the plurality of PAEK particles within one of a plurality of particle size ranges, the process comprising the steps of:

determining a particle size distribution of the plurality of PAEK particles in the feedstock based on respective numbers of the plurality of PAEK particles within each of the plurality of particle size ranges, the plurality of particle size ranges having at least three size ranges;

identifying at least two of the plurality of particle size ranges having a depressed melting temperature relative to the average melting temperature of the plurality of PAEK particles in the feedstock based on the particle size distribution determination by number, and reducing the respective numbers of the plurality of PAEK particles in the feedstock within the at least two of the plurality of particle size ranges having a depressed melting temperature relative to the average melting temperature of the plurality of PAEK particles in the feedstock based on the particle size distribution determination to form a prepared feedstock, the at least two of the plurality of particle size ranges have a particle diameter of 20 microns or less;

using the prepared feedstock in a selective laser sintering process comprising the step of applying a layer of the prepared feedstock on a bed of a laser sintering machine, solidifying selected points of the applied layer of the prepared feedstock by irradiation, successively repeating the step of applying the prepared feedstock and the step of solidifying the applied layer of the prepared feedstock until all cross sections of a three-dimensional object are solidified.

2. The process of claim 1 further comprising the step of:

determining a particle size distribution of the plurality of PAEK particles in the prepared feedstock based on respective numbers of the plurality of PAEK particles within each of the plurality of particle size ranges to confirm a sufficient number of particles having a depressed melting temperature have been removed from the feedstock.

3. The process of claim 1 wherein the depressed melting temperature is between 5 and 50 degrees Celsius below the average melting temperature of the plurality of PAEK particles in the feedstock.

4. The process of claim 1 further comprising the step of reducing the respective numbers of the plurality of PAEK particles in the feedstock within any of the plurality of particle size ranges comprising particle diameters of 10 microns or less.

5. The process of claim 1 further comprising the step of reducing the respective numbers of the plurality of PAEK particles in the feedstock within any of the plurality of particle size ranges comprising particle diameters of 15 microns or less.

6. The process of claim 1 further comprising the step of reducing the respective numbers of the plurality of PAEK particles in the feedstock within any of the plurality of particle size ranges comprising particle diameters of 25 microns to 20 microns.

7. The process of claim 1 further comprising the step of reducing the respective numbers of the plurality of PAEK particles in the feedstock within any of the plurality of particle size ranges comprising particles diameter of 30 microns to 20 microns.

8. The process of claim 1 wherein the feedstock comprises polyetherketoneketone (PEKK) particles.

9. The process of claim 8 wherein the depressed melting temperature is 5 or more degrees Celsius below the average melting temperature of the PEKK particles in the feedstock.

10. A process for preparing one or more polyaryletherketones for selective laser sintering, the process comprising the steps of:
    pulverizing the one or more polyaryletherketones to form a powder comprising polyaryletherketone (PAEK) particles,
    determining a particle size distribution of the PAEK particles based on respective numbers of the PAEK particles within each of a plurality of particle size ranges, the plurality of particle size ranges having at least three size ranges;
    creating a feedstock from the PAEK particle,
    limiting the respective numbers of the PAEK particles in the feedstock corresponding to at least two of the plurality of particle size ranges based on the particle size distribution determination by number, at least two of the plurality of particle size ranges having particle diameters of 20 microns or less
    using the prepared feedstock in a selective laser sintering process comprising the step of applying a layer of the prepared feedstock on a bed of a laser sintering machine, solidifying selected points of the applied layer of the prepared feedstock by irradiation, successively repeating the step of applying the prepared feedstock and the step of solidifying the applied layer of the prepared feedstock until all cross sections of a three-dimensional object are solidified.

11. The process of claim 10 further comprising the step of determining a particle size distribution of the PAEK particles in the feedstock after the limiting step based on respective numbers of the PAEK particles within each of a plurality of particle size ranges to confirm a sufficient number of particles in the at least two of the plurality of particle size ranges having particle diameters of 20 microns or less are removed from the feedstock.

12. The process of claim 10 further comprising the step of limiting the respective numbers of PAEK particles in the feedstock within one or more of the plurality of particle size ranges having particle diameters of 10 microns or less.

13. The process of claim 10 further comprising the step of limiting the respective numbers of PAEK particles in the feedstock within one or more of the plurality of particle size ranges having particle diameters of 15 microns or less.

14. The process of claim 10 further comprising the step of limiting the respective numbers of PAEK particles in the feedstock within one or more of the plurality of particle size ranges having particle diameters of 25 microns to 20 microns.

15. The process of claim 10 further comprising the step of limiting the respective numbers of particles in the PAEK feedstock within one or more of the plurality of particle size ranges having particle diameters of 30 microns to 20 microns.

16. The process of claim 15 wherein the feedstock comprises polyetherketoneketone (PEKK) particles.

17. The process of claim 16 wherein the depressed melting temperature is 5 or more degrees Celsius below the average melting temperature of the PEKK particles.

* * * * *